Figure 1:
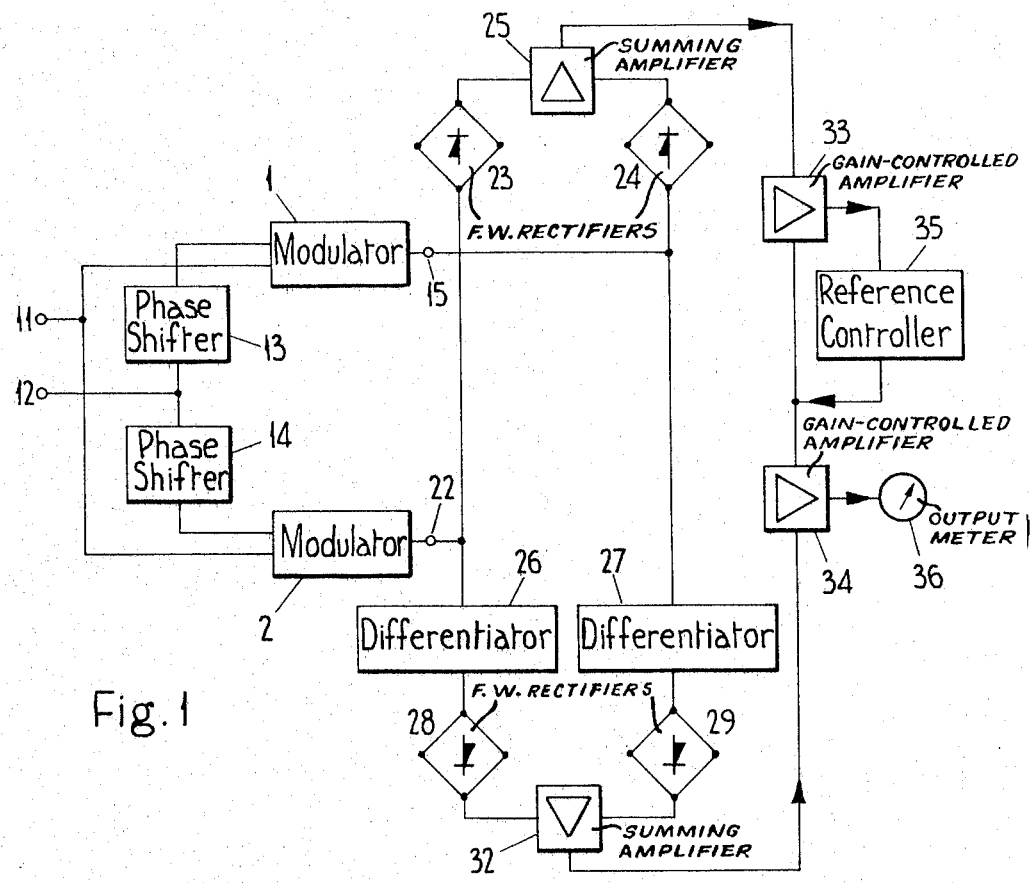

Jan. 10, 1967   D. L. CLAY   3,297,946
APPARATUS FOR DETERMINING THE FREQUENCY DIFFERENCE OF TWO
SIGNALS BY COMPARISON OF DIFFERENTIATED
AND UN-DIFFERENTIATED BEAT SIGNALS
Filed Dec. 17, 1963

INVENTOR
DAVID LANGSFORD CLAY
BY
ATTORNEYS

United States Patent Office 3,297,946
Patented Jan. 10, 1967

3,297,946
APPARATUS FOR DETERMINING THE FREQUENCY DIFFERENCE OF TWO SIGNALS BY COMPARISON OF DIFFERENTIATED AND UN-DIFFERENTIATED BEAT SIGNALS
David Langsford Clay, Coventry, England, assignor to The General Electric Company, Limited, London, England
Filed Dec. 17, 1963, Ser. No. 331,197
Claims priority, application Great Britain, Dec. 19, 1962, 47,922/62
5 Claims. (Cl. 324—82)

This invention relates to apparatus for investigating the difference frequency of two oscillatory electric signals.

When two oscillators are supplying oscillatory signals which are nominally of the same frequency, it may be desired to measure the difference in the actual frequencies of the two oscillatory signals. To do this, a beat signal may be produced, the frequency of the beat signal being equal to the difference frequency of the two oscillatory signals. Measuring the frequency of the beat signal will therefore give the difference in the frequencies of the two oscillatory signals, but where the frequency of the beat signal is very low, say 0.01 to 0.1 cycle per second, it is a matter of some difficulty to measure it.

It is therefore an object of the present invention to provide apparatus which may be used in circumstances such as are set out in the last paragraph, and which enables a measure of the difference frequency of the two oscillatory signals to be obtained.

According to the present invention, apparatus for investigating the difference frequency of two oscillatory signals comprises two modulators to each of which the two oscillatory signals are arranged to be supplied, each of the modulators supplying a beat signal the frequency of which is equal to the difference frequency of the two oscillatory signals, means to introduce a phase difference between one of the oscillatory signals supplied to one of the modulators and the same oscillatory signal supplied to the other modulator so that the beat signals differ in phase by 90 degrees, first means to produce from the beat signals a first unipolar signal the instantaneous magnitude of which is at any time proportional to the arithmetic sum of the instantaneous magnitudes of the beat signals at that time, second means to produce from the beat signals a second unipolar signal the instantaneous magnitude of which is at all times proportional to a factor times the arithmetic sum of the instantaneous magnitudes of the beat signals at that time, said factor being dependent on the frequency of the beat signals, and means to produce from the first and second unipolar signals a signal representing the value of said factor, from which the frequency of the beat signals may be determined.

Preferably the first means comprises first and second full-wave rectifiers to which the two beat signals respectively are arranged to be supplied, and means to sum the instantaneous magnitudes of the signals supplied by the first and second rectifiers to provide the first unipolar signal, and the second means comprises means to produce from each of the beat signals a differentiated signal the instantaneous magnitude of which is at all times proportional to the differential of the relevant beat signal, third and fourth full-wave rectifiers to which the two differentiated signals respectively are arranged to be supplied, and means to sum the instantaneous magnitudes of the signals supplied by the third and fourth rectifiers to provide the second unipolar signal.

Figure 2:
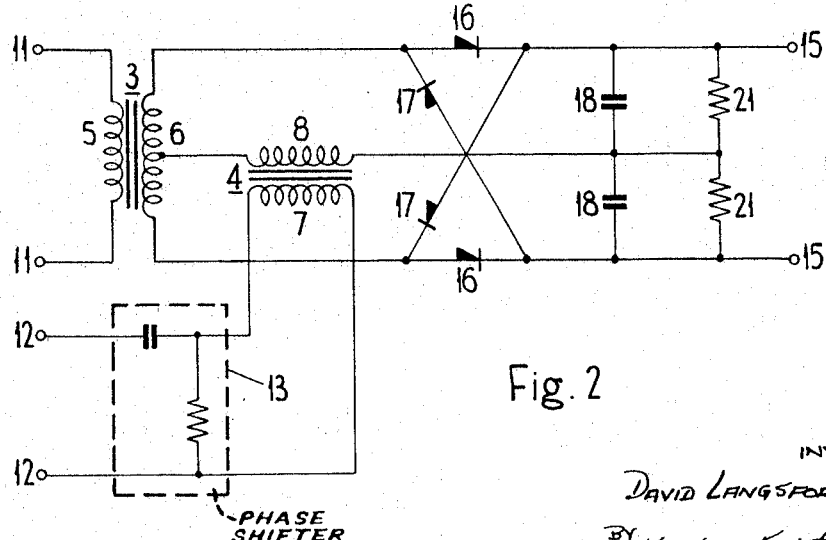

Apparatus for investigating the frequency difference of two oscillatory electric signals, the apparatus being in accordance with the present invention, will now be described by way of example with reference to the accompanying drawing of which FIGURE 1 is a schematic diagram of the apparatus and FIGURE 2 is a circuit diagram of a modulator included in the apparatus.

The two oscillatory signals, the frequency difference of which is to be investigated, are supplied by two oscillators (not shown), respectively, the oscillators operating at nominally the same frequency. In fact, however, there may be a small difference in the frequencies of the signals supplied by the two oscillators, and if this is so, it is desired to measure this difference.

In a particular embodiment, the two signals each have a frequency which is nominally 8.5 megacycles per second, but in fact the frequencies may differ by about one part in $10^7$ or less.

Hereinafter the actual frequencies of the two signals will be referred to as $F_1$ and $F_2$, and the difference in these frequencies will be referred to as $f$. It follows, therefore, that:

$$F_1 = F_2 \pm f$$

Referring to the schematic diagram of FIGURE 1, first and second modulators 1 and 2 are shown connected to input terminals 11 and 12 both directly and by way of phase shifting networks 13 and 14. The modulators 1 and 2 include first and second transformers 3 and 4 each having a primary and a secondary winding 5 and 6, and 7 and 8 respectively. Modulator 1 together with its associated phase shifting network 13 will now be described with reference to FIGURE 2 of the drawings.

The two ends of the primary winding 5 of the first transformer 3 are connected directly to a pair of input terminals 11, and the ends of the primary winding 7 of the second transformer are connected to a pair of input terminals 12 by way of the phase shifting network 13. This phase shifting network 13 comprises capacitance and resistance, and is such that signals supplied by way of the phase shifting network 13 to the primary winding 7 of the transformer 4 are shifted in phase by plus 45 degrees.

In the case of the second modulator 2 (shown schematicaly in FIGURE 1) the two ends of the primary winding of the first transformer are connected directly to the pair of input terminals 11, and the ends of the primary winding of the second transformer are connected to the pair of input terminals 12 by way of a phase shifting network 14. This phase shifting network 14 comprises inductance and resistance, and is such that signals supplied by way of the phase shifting network 14 to the primary winding of the second transformer are shifted in phase by minus 45 degrees.

Apart from these differences in the associated phase shifting networks 13 and 14, the first and second modulators 1 and 2 are identical.

Referring again to FIGURE 2, the two ends of the secondary winding 6 of the transformer 3 are connected to a pair of output terminals 15 by way of two rectifier elements 16, respectively, these rectifier elements 16 having their anode terminals nearer the secondary winding 6. The output terminals 15 are also cross-coupled by way of two further rectifier elements 17, respectively, to the ends of the secondary winding 6 of the transformer 3, these rectifier elements 17 having their cathode terminals nearer the secondary winding 6.

The output terminals 15 are also connected together by way of two equal capacitors 18 in series, each of these capacitors 18 being shunted by a resistor 21, the two resistors 21 also being equal. The secondary winding 6 of the transformer 3 has a centre tapping, this centre tapping being connected by way of the secondary winding 8 of the transformer 4 to the junction of the two capacitors 18.

The numbers of turns in the primary winding 5 of the first transformer 3, and each winding of the transformer 4, are equal, and are equal to half the number of turns in the secondary winding 6 of the transformer 3.

The output terminals 15 of the modulator 1 and the output terminals 22 of the second modulator 2 are connected to two full-wave rectifiers 24 and 23 respectively, the outputs of which are both connected to a first adding amplifier 25.

The output terminals 15 and 22 of the modulators 1 and 2 are also connected by way of two differentiating circuits 27 and 26, respectively, to two full-wave rectifiers 29 and 28, respectively, the output of which are both connected to a second adding amplifier 32.

The outputs of the adding amplifiers 25 and 32 are connected to two gain-controlled amplifiers 33 and 34. The signal supplied by the gain-controlled amplifier 33 is compared with a constant amplitude signal supplied by a reference source 35, to provide a control signal which is supplied to both the gain-controlled amplifiers 33 and 34 to control the gains thereof inversely with the amplifier 33 output. The first gain-controlled amplifier thus supplies a signal of substantially constant amplitude.

The operation of the apparatus is as follows. The signals of frequency $F_1$ and $F_2$ are each supplied to the modulators 1 and 2 by way of the input terminals 11 and 12 respectively, the signal of frequency $F_2$ then being, in each case, supplied by way of the phase shifting networks 13 and 14. Each of the modulators 1 and 2 therefore supplies a beat signal of frequency $f$ but, due to the phase shifting networks 13 and 14, these signals differ in phase by 90 degrees.

The beat signal supplied by modulator 1 may therefore be represented by $\sin 2\pi ft$, and this will be taken as equal to $a$. The beat signal supplied by modulator 2 is then represented by plus or minus $\cos 2\pi ft$, and this will be taken as equal to $b$. Using this notation, the signal supplied by the first adding amplifier 25 is a unipolar signal represented by $(a+b)$.

Similarly, the signal supplied by the first differentiating network 27 is $fk \cos 2\pi ft$, where $k$ is a constant determined by the circuit values, and the signal supplied by the second differentiating network 26 is minus or plus $fk \sin 2\pi ft$. The signal supplied by the second adding amplifier 32 is therefore a unipolar signal represented by $fk(a+b)$.

The unipolar signal represented by $(a+b)$ is then supplied to the gain-controlled amplifier 33, and the unipolar signal represented by $fk(a+b)$ is supplied to the gain-controlled amplifier 34. Each of these unipolar signals has a ripple, the frequency of which is twice the frequency of the beat signal. The derivation of the control signal and the response of the gain-controlled amplifiers 33 and 34 is sufficiently rapid for each of these amplifiers to supply a substantially ripple-free output signal.

The amplitude of the output signal supplied by the gain-controlled amplifier 34 is proportional to $f$ and the measurement of this amplitude gives the required difference frequency. This may be done by supplying the output signal supplied by the gain-controlled amplifier 34 to a meter 36 which has been calibrated using signals having a known difference frequency.

A number of modifications and additions to the described apparatus may be incorporated. Thus the loads presented to the signal of frequency $F_2$ vary and do not vary in step. It is preferable, therefore, the modulators 1 and 2 be supplied with the signal of frequency $F_2$ by way of separate buffer amplifiers, to avoid the possibility of these varying loads affecting the frequency of operation of the source supplying the signal frequency $F_2$.

Instead of using the gain-controlled amplifiers 33 and 34, the unipolar signals may be supplied to a ratiometer, that is to say, a measuring instrument having two coils but no restoring spring. The reading of the ratiometer is proportional to the ratio of the amplitudes of the unipolar signals, so the scale of the ratiometer may be calibrated so as to show the frequency directly.

Again, the first and second differentiating networks 26 and 27 may be replaced, by first and second integrating networks. The operation is then similar to that described above, except that in this case the level of the output signal supplied by the second gain-controlled amplifier is proportional to $1/f$.

It is not essential to shift the frequencies of both the signals of frequency $F_2$, as the effect is the same if only one is shifted by 90 degrees.

What we claim is:
1. Apparatus for investigating the difference frequency of two oscillatory signals, comprising
   (A) two input terminals to which the two oscillatory signals are respectively supplied,
   (B) modulation means connected to both said terminals to supply two beat signals the frequencies of which are both equal to the difference frequency of the two oscillatory signals but which differ in phase by 90 degrees,
   (C) first means connected to output terminals of said modulation means
      (i) and including rectifying and summing means,
      (ii) to produce from the beat signals a first unidirectional signal the instantaneous magnitude of which is proportional to the arithmetic sum of the instantaneous magnitudes of the beat signals,
   (D) second means also connected to said output terminals of said modulation means
      (i) and including differentiating, rectifying and summing means,
      (ii) to produce from the beat signals a second unidirectional signal the instantaneous magnitude of which is proportional to a factor times the arithmetic sum of the instantaneous magnitudes of the beat signals said factor being the angular frequency of the beat signals, and
   (E) means conected to said first and second means to produce the ratio of the first and second unidirectional signals,
      (i) said ratio representing said factor, from which the frequency of the beat signals may be determined.
2. Apparatus as claimed in claim 1 wherein
   (A) said first means comprises
      (i) first and second full-wave rectifiers to which said two beat signals are applied respectively, and
      (ii) means to sum the signals supplied by the first and second rectifiers to provide the first unidirectional signal, and
   (B) the second means comprises
      (i) first and second differentiating means to which said beat signals are applied respectively to produce from each of the beat signals a differentiated signal the instantaneous magnitude of which is at all times proportional to the differential of the relevant beat signal,
      (ii) third and fourth full-wave rectifiers connected to the differentiating means respectively, and to which the two differentiated signals are supplied, and
      (iii) means to sum the signals supplied by the third and fourth rectifiers to provide the second unidirectional signal.
3. Apparatus as claimed in claim 1, wherein
   (A) said means to produce from the first and second unidirectional signals a signal representing said factor comprises
      (i) a first gain-controlled amplifier the input terminals of which are connected to output terminals of said first means to receive said first unidirectional signal,
      (ii) a second gain-controlled amplifier the input terminals of which are connected to output terminals of said second means to receive said second unidirectional signal, and

(iii) reference means connected in a closed servo-loop with the first gain-controlled amplifier to control its gain so that its output remains constant,
(iv) the reference means also being connected to the second gain-controlled amplifier to control its gain in unison with that of the first gain-controlled amplifier,
(v) the output signal from the second gain-controlled amplifier then representing said factor.

4. Apparatus for investigating the difference frequency of two oscillatory signals and comprising
(A) modulation means to which both of said signals are applied to produce beat signals of the same frequency but in phase quadrature,
(B) two channels to each of which both of said beat signals are applied,
  (i) one of said channels comprising
    (a) first and second rectification means to which said beat signals are respectively applied,
    (b) first summing means to which the rectified beat signals are applied,
    (c) means to which the output signal from said first summing means is applied to produce a signal inversely proportional to this output signal, and
  (ii) the other of said channels comprising
    (a) first and second differentiating means to which said beat signals are respectively applied, each providing an output signal including as a factor the frequency of the said beat signals,
    (b) third and fourth rectification means to which said output signals proportional to the beat frequency are respectively applied,
    (c) second summing means to which the signals from said third and fourth rectification means are applied,
(C) and a gain-controlled amplifier circuit to which the output signal from said second summing means is applied as an input signal, said signal inversely proportional to the signal from said first summing means is applied as a gain-controlling signal and
(D) the output signal from the gain-controlled amplifier providing a continuous representation of said beat signal frequency.

5. Apparatus in accordance with claim 4, and comprising visual metering means to which said output signal from the gain-controlled amplifier is applied to provide a visual indication of the difference frequency in question.

References Cited by the Examiner
UNITED STATES PATENTS

| | | | |
|---|---|---|---|
| 2,561,182 | 7/1951 | Crane | 324—82 X |
| 2,933,682 | 4/1960 | Moulton et al. | 324—79 |
| 2,935,686 | 5/1960 | Kerns et al. | 328—133 |
| 2,966,584 | 12/1960 | Isley. | |
| 3,035,231 | 5/1962 | Neelands et al. | |

RUDOLPH V. ROLINEC, *Primary Examiner.*
WALTER L. CARLSON, *Examiner.*
P. F. WILLE, *Assistant Examiner.*